United States Patent [19]

Dettwiler

[11] Patent Number: 4,699,101
[45] Date of Patent: Oct. 13, 1987

[54] VOLUMETRIC DISPLACEMENT FLUID MACHINE

[76] Inventor: Georges Dettwiler, 12405, Jasmin, Montreal, Quebec, Canada, H4K 1W1

[21] Appl. No.: 851,829

[22] Filed: Apr. 14, 1986

[51] Int. Cl.[4] .......................................... F02B 53/04
[52] U.S. Cl. ................................ 123/238; 123/234; 418/191
[58] Field of Search ............... 123/234, 235, 238, 249; 418/191

[56] References Cited

U.S. PATENT DOCUMENTS 1,818,882  8/1931  Demuynck .................. 123/249 X
3,203,406  8/1965  Dettwiler .

FOREIGN PATENT DOCUMENTS 780666  3/1968  Canada .

Primary Examiner—Stephen F. Husar

[57] ABSTRACT

This machine can serve as a compressor or motor and, more specifically combines a compressor and a motor to constitute an internal combustion engine with compressed air injection. A toothed rotor is rotatable in a fluid displacement chamber and in sealing contact with a sealing rotor having peripheral cavities for receiving the teeth of the toothed rotor. Both rotors are axially curved, so as to better resist differential axial thrust exerted on the same and, therefore, maintaining better sealing contact. The teeth of the toothed rotor are generally of a hemispherical shape to facilitate the provision of effective sealing segments. When used as an internal combustion engine, a combined fuel injection and ignition device is provided enclosed within a sleeve rotatable within the engine housing, the sleeve having a lateral opening which can be made to selectively register with one of two housing passages opening in two adjacent fluid displacement chambers, with the result that the engine can be reversed by the simple rotation of the ignition device enclosing sleeve.

15 Claims, 3 Drawing Figures

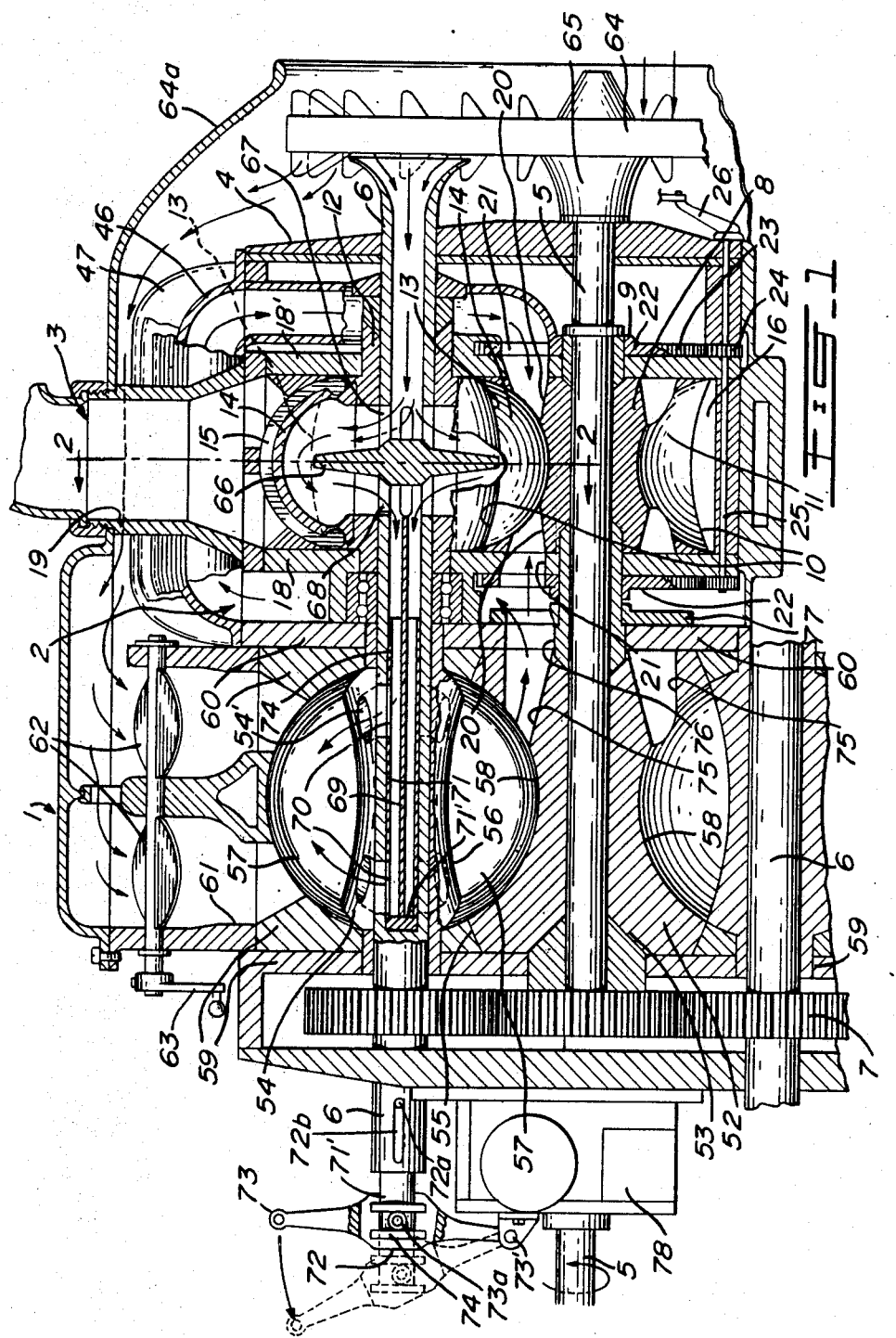

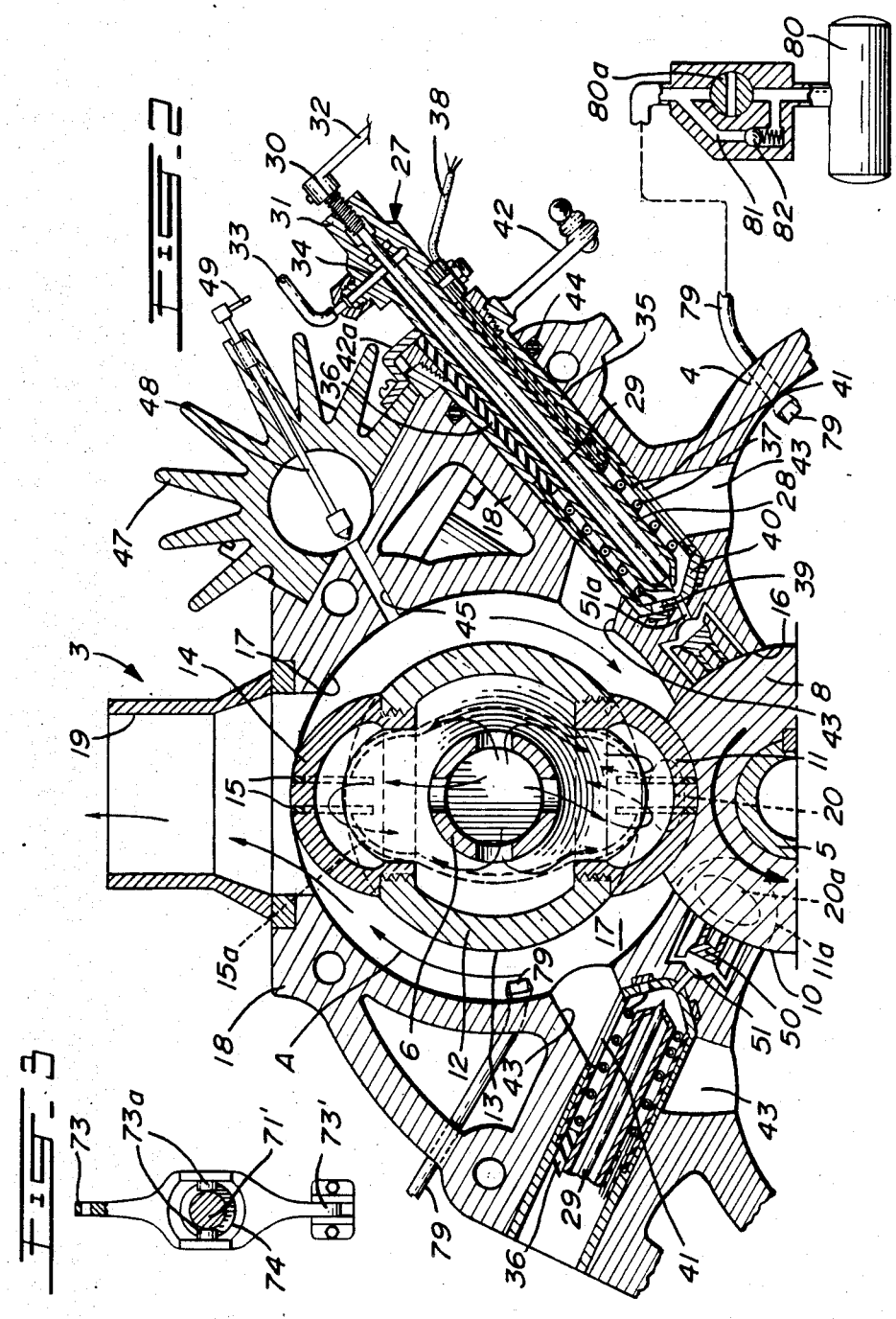

VOLUMETRIC DISPLACEMENT FLUID MACHINE

FIELD OF THE INVENTION

The present invention relates to a rotary volumetric displacement fluid machine to be used as fluid motors and pumps and including internal combustion engines.

BACKGROUND OF THE INVENTION

Applicant's prior U.S. Pat. No. 3,203,406 dated Aug. 31, 1965 and prior Canadian Patent No. 780,666 dated Mar. 19, 1968, disclose rotary engines of the type in which a toothed rotor rotates in sealing contact with a sealing rotor and with its teeth meshing with cavities at the periphery of the sealing rotor. It has been found difficult to provide effective sealing between the two rotors and also between the toothed rotor and the surface of its chamber.

It has been found that this was mainly due to the fact that the two rotors were of cylindrical shape, as were their enclosing chambers, resulting in difficult to seal corner wall portions and also a relative axial displacement of the two rotors upon differential axial pressure exerted thereon, especially in the compressor unit where axial pressure is exerted on the sealing rotor upon discharge of the compressed air from one end of the compressor unit.

It is therefore the general object of the present invention to provide a machine of the character described, which will overcome the above-mentioned disadvantage of the rotary machine described in applicant's prior patents.

Another object of the present invention is to provide a machine of the character described, which, when used as an internal combustion engine, incorporates a novel and effective combined fuel injector and ignition unit.

Another object of the present invention is to provide an engine of the character described, in which the fuel injection and ignition unit is arranged so as to inject fuel in either one of two adjacent combustion chambers in such a manner as to reverse the engine rotational direction.

Another object of the present invention resides in the provision of an engine of the character described, in which the volumetric efficiency is made optimum for a given machine size, in both the compressor and the motor mode.

Another object of the present invention is to provide a machine of the character described, which, when used as an internal combustion engine, has means for efficient sweeping of the burnt gases.

SUMMARY OF THE INVENTION

The rotary volumetric displacement fluid machine of the present invention comprises a housing, two parallel shafts journalled in the housing, a sealing rotor and a toothed rotor keyed to the respective shafts, both rotors having sealingly-contacting peripheral surfaces, means causing rotation of the rotors in opposite directions, the peripheral surfaces being cross-sectionally circular and axially curved, the sealing rotor curvature being reversed to and mating with the toothed rotor curvature, the teeth of the toothed rotor having a matching fit with cavities at the periphery of the sealing rotor. Preferably, the teeth of the toothed rotor hhve a generally half-spherical shape. When the machine is used as a fluid compressor, the peripheral surface of the toothed rotor is concave for maximum volumetric efficiency. When the machine is used as a motor, the peripheral surface of the toothed rotor is longitudinally convex for maximum output torque. One of the inlet and outlet ports of the fluid displacement chamber is located in the sealing rotor cavity and forms a passage in the sealing rotor, which is normally closed by an end wall of the chamber, to have a timed valving action with a registering opening in said chamber and wall. The sealing rotor of the motor unit preferably has a diameter so as to rotate twice the speed of the toothed rotor and, therefore, has twice the cavities as there are teeth of the toothed rotor, so as to increase the working stroke of the toothed rotor.

BRIEF DESCRIPTION OF THE DRAWINGS

In the annexed drawings:

FIG. 1 is a longitudinal section of a rotary internal combustion engine made in accordance with the principles of the invention;

FIG. 2 is a partial cross-section taken along line 2—2 of FIG. 1; and

FIG. 3 is a cross-section at the lever for operating the valving tube.

The machine as described comprises, as in applicant's prior above-noted patents, a compressor unit, generally indicated at 1, a compressed air storage chamber 2, and a motor unit 3, all housed within a housing 4 through which extend parallel shafts including a central sealing rotor carrying shaft 5 and equally angularly spaced toothed rotor-carrying shafts 6. In the example shown, the central shaft 5 is surrounded by three satellite shafts 6, as in the arrangement shown in FIG. 5 in applicant's prior U.S. Pat. No. 3,203,406. In the example shown, the satellite shafts 6 rotate at the same speed but in opposite direction from central shaft 5 through gearing 7.

Referring to the motor unit 3, a sealing rotor 8 is keyed to central shaft 5 along with bushing 9. This sealing rotor 8 has a peripheral surface 10, which is circular in cross-section, but which is longitudinally curved, namely: which is concave. Two diametrically-opposed tooth-receiving cavities 11 are formed at the peripheral surface 10 of the sealing rotor 8, these cavities being of generally part spherical shape. A toothed rotor 12 is keyed to each of the satellite shafts 6; it has a peripheral surface 13 which is of cross-sectionally circular shape but of longitudinally curved shape, namely: convex shape to sealingly fit the longitudinally concave shape of the peripheral surface 10 of the sealing rotor 8, so as to be in sealing and rolling contact therewith. Two diametrically-opposed generally semispherical teeth 14 are screwed within the rotor 12 and these are designed to successively have a sealing fit with the cavities 11 of the sealing rotor 8 during counterrotation of these two rotors. Teeth 14 carry sealing segments 15, of curved shape, as shown in FIG. 1. The housing 4 defines a sealing rotor chamber 16 for the motor unit and as many fluid displacement chambers 17, called combustion chambers 17, for the motor unit. Partition walls 18, 18' in housing 4 define the end walls of the chambers 16, 17 and are in sliding contact with the ends of the two rotors 8 and 12. Combustion chamber 17 has an outlet or exhaust port 19 diametrically opposite the sealing rotor 8 with respect to the satellite shaft 6. Chamber 17 has also inlet ports for the admission of pressurized air. These ports are indicated at 20;

they directly open within the sealing rotor cavities 11 from longitudinally opposite ends of said cavities, and, once for each rotation of the sealing rotor, they come in register with end wall openings 21, so as to form a timed valving action to admit the pressurized air within the combustion chamber at the proper time during rotation of the toothed rotor. Each end wall opening 21 can be adjustably thtottled by a throttling disc 22, the angular position of which is adjustable through its gear teeth 23 which mesh with pinions 24 carried by the shaft 25 of a throttling lever 26, this arrangement being similar to that described in applicant's prior U.S. Pat. No. 3,203,406 in relation with throttling disc 109,110, as shown in FIGS. 9 and 8, respectively, and also in FIG. 13. A combined fuel injection and ignition device, generally indicated at 27, extends radially of the central shaft 5 in the housing wall portion separating each pair of adjacent combustion chambers 17. The device 27 includes a central, cylindrical nozzle 28 having a radially inner nozzle orifice adjustably closed by a needle valve 29, centrally extending through the nozzle 28 and axially adjustable by rotation of its threaded radially outer portion 30 in the threaded head 31 of the nozzle body through the means of a lever arm 32 secured to the needle valve 29. Fuel under pressure from a suitable fuel pump is supplied to the nozzle 28 through hose 33 and passage 34. Nozzle 28 is fixedly retained within a cylindrical sleeve 35 with the interposition of heat-insulating bushing 36, this bushing extending short of the radially inner portion of the nozzle 28, so as to form an annular clearance in which is located an electric resistance wire 37, which is directly wound around the nozzle radially inner portion, being supplied with electricity through a cable 38 at one end, the other end of the resistance wire 37 being grounded at 39. Sleeve 35 is completely closed at its radially inner end by closure wall 40, but has a lateral opening 41 for the discharge of the pre-heated and vaporized fuel. Sleeve 35 is axially rotatable within the bore of the housing 4 in which it is located by means of an operating lever 42, so that its lateral opening 41 can be selectively registered with one or the other of two oppositely-extending passages 43 made in the portion of the housing wall between the two adjacent combustion chambers 17. An O-ring 44 seals the sleeve 35. In the rotated position of the sleeve 35, shown in FIG. 2, the toothed rotor 12 is caused to rotate in accordance with arrows A in clockwise direction. The rotors are shown in their dead center position. As soon as the bottom tooth 14 starts to rotate clockwise, the inlet port indicated in dotted lines in FIG. 2 at 20, become uncovered downstream from the tooth and feeds compressed air behind the tooth as long as the cavity 11 remains in communication with the combustion chamber. Numerals 11a and 20a show a rotated position of cavity 11 and port 20. When the sealing segments 15 of the bottom tooth move passed the passage 43, this passage becomes filled with pressurized air and then pre-heated fuel is admitted within said air, resulting in ignition and combustion of the fuel behind the tooth, resulting in the pressure stroke which lasts until the tooth has reached almost the topmost head center position, whereupon the burnt gases are exhausted. It is obvious that rotation of the sleeves 35 through half a turn will cause registering of their lateral opening 41 with the passage 43 of the adjacent combustion chambers, causing rotation of the rotor in the opposite direction.

Referring again to FIG. 2, any burnt gas remaining in the right-hand portion of the combustion chamber 17 can be swept away through the exhaust port 19 by air under pressure supplied through a bleeding passage 45 made in the housing 4 and in communication with the pressurized air conduit 46, which connects the pressurized air, storage chamber 2 disposed intermediate the compressor unit 1 and the motor unit with the inlet port 20 at the outer end of the motor unit. This conduit 46 is preferably provided with heat-radiating fins 47. The amount of air fed through passage 45 can be manually adjusted by needle valve 48 operated by lever 49. Adjacent combustion chambers 17 are sealed from each other by sealing segments 50 pressed against the peripheral surface of the rotor by air under pressure supplied by passages 51. A bore 51a extends from passage 51 and opens opposite the orifice of nozzle 28 and the tip of needle valve 29. Bore 51a discharges a pulse of compressed air into passage or pre-combustion chamber 43 to sweep away the burnt gases and injects fresh air into chamber 43: this considerably facilitates ignition of the fuel mixture.

The compressor unit 1 (see FIG. 1) includes a sealing rotor 52 keyed on the central shaft 5 and common to three toothed rotors 54 angularly, equally spaced around the central shaft 5, being keyed to the satellite shafts 6, which are arranged concentric with central shaft 5. As for the engine rotors, the sealing rotor 52 and toothed rotors 54 are of circular cross-sectional shape, but are curved axially of the rotor. More specifically, the peripheral surface 55 of the sealing rotor is convex axially of the rotor and fits the longitudinally concave peripheral surface 56 of the toothed rotor 54 to have a sealing rolling contact therewith. The teeth 57 of the toothed rotor 54 are of generally hemi-spherical shape. In the example shown, there are two diametrically-opposed teeth 57 and each adapted to engage a matching peripheral cavity 58 in the sealing rotor 52. There are two diametrically-opposed cavities 58, the two rotors being designed to rotate in inverse direction at the same peripheral speed. The end faces of the two rotors 52, 54 are flat and in sliding contact with the partition walls 59, 60 of the housing 4. The housing also defines a fluid displacement cross-sectionally circular chamber and a rotor chamber in the same manner as for motor unit 3 and having a surface in sliding contact with the teeth 57 and the longitudinally convex surface of the sealing rotor 52. The compressor unit 1 has a main air inlet port 61, which is diametrically opposed to the sealing rotor 52 with respect to the satellite shaft 5 and which is provided with butterfly valves 62 rotatably adjustable by a lever 63 which is connected to lever 32 of fuel injector needle valve 29 for correlating fuel injection with air admission.

Means are provided to cool the toothed rotors 12 of the motor unit 3 by means of a compressed air supply and to inject this air into the compressor unit. Each satellite shaft 6 is of hollow construction and opens at one end opposite a closed ring air pressurising turbo fan 64, the nut-hub 65 of which is secured to the central shaft 5. Turbo fan 64 also feeds precompressed air to main inlet port 61 of compressor 1 through a cowling 64a. Each toothed rotor 12, including its teeth 14, is of hollow construction and is provided with a central baffle 66, causing the air supplied by the fan and which circulates through the hollow shaft to enter the toothed rotor 12 through shaft opening 67; then move around the surface of the hollow rotor to be discharged through shaft opening 68. The air is then divided into two streams by the longitudinal partition wall 69 within the satellite shaft 6, each stream issuing at the peripheral surface of the toothed rotor 54 of the compressor unit 1 as shown at 54', contiguous to each tooth 57 at each end of the tooth and on the downstream side thereof. A valving tube 71 is inserted into the hollow satellite shaft 6 and has a solid outer end portion 71' and a pair of openings 70 in its hollow portion, openings 70 normally in register with apertures 54' in one axial position of valving tube 71 and closing apertures 54' in its other axial position. Tube 71 rotates with shaft 6: it has a radial pin 72a slidable in a slot 72b of shaft 6. An operating lever 73 pivoted at 73' to the engine block, longitudinally shifts tube 71 between its two positions while allowing its rotation since its two studs 73a engage between flanges 74 of tube 71.

Operating lever 73 is linked to operating lever 42 of fuel injector 27 in such a manner that in the normal direction of motor rotation as indicated by arrow A in FIG. 2, compressed air is discharged from shaft 6 into the compressor unit behind each tooth 57. This air injection is cut off when the motor rotation is reversed.

The air compressed by the toothed rotor is discharged through outlet port 75, which forms a passage within the body of the sealing rotor 52, opening within cavity 58 and at the end face of the sealing rotor to register at the end of the compression stroke, with an opening 76 made in partition wall 60. Therefore, the air discharges between the two partition walls 60 and 18, which define the compressed air storage chamber 2. Because the rotor rotates with respect to opening 76, there is a valving action defined to discharge the compressed air from the compressing toothed rotor 54 at an end of the compression stroke. If desired, a valving disc 77 may be keyed to the central shaft 5 to rotate with a sliding fit against the partition wall 60; but this valve disc is not essential.

If the engine has an electric starter, not shown, it is preferably arranged to drive one of the satellite shafts 6. Either one of the shafts 5 or 6 can be used as an output shaft. The central shaft 5 also drives the fuel injection and the lubricating oil pump, schematically shown at 78. A compressed air starter can be used including a compressed air bottle 80 connected through a manual cut-off valve 80a to an air pipe 79 opening within each toothed rotor chamber 17 of motor unit 3. The compressed air from bottle 80 is mixed with fuel in chamber 16 and ignited, valve discs 22 being closed. After pressure build-up in chamber 2 is sufficient, valve discs 22 are opened and cut-off valve 80a closed. Bottle 80 can be refilled through by-pass 81 provided with check valve 82. The butterfly valves 62 are made to close the air inlet port 61 for starting the engine. Thus, during engine starting, air for the compressor unit 1 by turbofan 64 through the satellite shaft openings 70, on the downstream side of the teeth 57. The air is compressed and a gradual pressure build-up is effected in the storage chamber 2. When the necessary pressure has been attained, the butterfly valves 62 are opened to supply the full amount of air to the engine. Regulation of the motor speed is achieved by regulating the throttling disc 22 in conjunction with the needle valve 29 of the fuel injection and ignition device 27. The engine can be slowed down and reversed in its direction of rotation by rotating sleeve 35 by means of its operating lever 42 in conjunction with the change of position of the valving tube 71 by means of its lever 73. For certain applications the compressor unit 1 can be dispensed with and pressurized air from cowling 64a directly injected into storage chamber 2.

What I claim is:

1. A rotary volumetric displacement fluid machine comprising: a housing, two parallel shafts journalled in said housing, a sealing rotor and a toothed rotor keyed to the respective shafts; both rotors having sealingly contacting peripheral surfaces, means causing rotation of said rotors in opposite directions, said peripheral surfaces being cross-sectionally circular and axially curved, the sealing rotor curvature reversed relative to and mating with the toothed rotor curvature, said toothed rotor having at least two teeth, said sealing rotor having at least one peripheral cavity, of a shape to receive said teeth with a matching fit, said housing defining intersecting and communicating chambers in which said rotors are located, the chamber housing said toothed rotor having surfaces conformed to have a sliding fit with said teeth, said housing having fluid inlet and outlet ports for admitting into and expelling fluid from the chamber housing said toothed rotor.

2. A machine as defined in claim 1, wherein said chambers have end walls with which the ends of said rotors have a sliding fit, one of said ports being located in said sealing rotor, opening in said at least one cavity and forming a passage extending through said sealing rotor to an end thereof to have a timed valving action with an opening made in the contiguous chamber end wall.

3. A machine as defined in claim 2, wherein said toothed rotor and its carrying shaft are hollow and in communication with each other, and further including means to circulate a fluid through said hollow shaft and through said hollow toothed rotor.

4. A machine as claimed in claim 2, wherein the shaft carrying said toothed rotor is hollow and communicates with the chamber containing the toothed rotor through openings at the peripheral surface of the toothed rotor contiguous to each tooth and downstream therefrom relative to the rotational direction of said toothed rotor, and means to supply fluid under pressure to said toothed rotor shaft, in order to discharge said fluid into said toothed rotor chamber through said openings.

5. A machine as defined in claim 2, said machine constituting a fluid compressor, the peripheral surface of said toothed rotor and sealing rotor being longitudinally concave and convex, respectively, the port located in said at least one cavity constituting a fluid outlet port.

6. A machine as defined in claim 4, wherein said machine constitutes a fluid compressor, the peripheral surfaces of said toothed rotor and sealing rotor being longitudinally concave and convex, respectively, the port located in said at least one cavity constituting a fluid outlet port.

7. A machine as defined in claim 2, wherein said machine is a pressure fluid-operated motor, the peripheral surfaces of said toothed rotor and of said sealing rotor being longitudinally convex and concave, respectively, the port located in said at least one cavity being a fluid inlet port, the outlet port located at a portion of said toothed rotor chamber, which is diametrically opposite to the sealing rotor relative to the shaft axis of the toothed rotor.

8. A machine as defined in claim 7, further including a fuel injection and igniting device carried in said housing, said device including an injector nozzle surrounded by an electric resistance element engaged in a sleeve having a lateral discharge opening for communication with a housing passage opening in the toothed rotor chamber angularly close to said sealing rotor to discharge a heated and vaporized fuel into said passage in timing relation with said toothed rotor rotation.

9. A machine as claimed in claim 8, wherein said sealing rotor has a diameter, so as to rotate at twice the speed of the toothed rotor and has twice as many cavities as there are teeth on said toothed rotor.

10. A machine as defined in claim 8, wherein there are at least two toothed rotors and associated chambers arranged around and concentric with a common sealing rotor and its associated chamber, with one said fuel injection and igniting device located between two toothed rotor chambers, there being for each said device two oppositely-directed housing passages opening in the two toothed rotor chambers, said sleeve being axially rotatable to selectively register its lateral discharge opening with one or the other of the two housing passages, so as to change the rotational direction of said toothed rotor.

11. A machine as defined in claim 10, further including means to admit pressurized air into the toothed rotor chamber in the downstream portion of the latter chamber to complete sweeping of the burnt combustion gases through said outlet port.

12. A machine as defined in claim 8, further including means to inject pressurized air directly onto said injector nozzle to supply fresh air into said housing passage.

13. A machine as defined in claim 12, further including starting means for said machine comprising a supply of compressed air fed into the toothed rotor chamber through a cut-off valve and air line.

14. A machine as defined in claim 13, further including a by-pass with a check valve by-passing said cut-off valve, serving to refill said supply when said cut-off valve is closed.

15. The combination of a gas compressor with a fuel-operated motor, comprising a housing having a compressor housing section, a motor housing section and an intermediate compressed gas chamber between the compressor housing section and the motor housing section; two parallel shafts journalled in said housing; a motor sealing rotor and a compressor sealing rotor, keyed to one shaft and located in said motor housing section and compressor housing section, respectively; a motor toothed rotor and a compressor toothed rotor keyed to the other shaft and located in said motor housing section and compressor housing section, respectively; each sealing rotor coacting with a toothed rotor; both coacting rotors having sealingly-contacting peripheral surfaces, means causing rotation of said shafts in opposite directions, said peripheral surfaces being cross-sectionally circular and axially curved, each toothed rotor having at least two teeth, each sealing rotor having at least one peripheral cavity of a shape to receive said teeth with a matching fit, each housing section defining intersecting and communicating chambers in which the respective rotors are located, the chambers, housing the toothed rotors, having surfaces formed to have a sliding fit with said teeth, each housing section having gas inlet and outlet ports for admitting into and expelling gas from the chamber housing the toothed rotor, each chamber having end walls with which the ends of the rotor housed therein has a sliding fit, one of said ports being located in said sealing rotor, opening in said at least one cavity and forming a passage extending through said sealing rotor to an end thereof to have a time-valving action with an opening made in the contiguous chamber end wall; the peripheral surfaces of the compressor toothed rotor and of the compressor sealing rotor being longitudinally concave and convex, respectively, the ports located in said at least one cavity of said compressor sealing rotor constituting a gas outlet port, the peripheral surfaces of the motor toothed rotor and of the motor sealing rotor being longitudinally convex and concave, respectively, the port located in said at least one cavity of the motor sealing rotor being a gas inlet port, the outlet port of the motor housing section being located in a portion of the motor toothed rotor chamber, which is diametrically opposite to the motor sealing rotor relative to the axis of the shaft carrying said two toothed rotors; said motor housing section further including a fuel injection and igniting device, said device including an injector nozzle surrounded by an electric resistance element engaged in a sleeve having a lateral discharge opening for communication with a housing passage opening in the motor toothed rotor chamber angularly closed to said motor sealing rotor to discharge a heated and vaporized fuel into said passage in timing relation with said motor toothed rotor rotation.

* * * * *